United States Patent [19]
Mowry et al.

[11] Patent Number: 5,264,980
[45] Date of Patent: * Nov. 23, 1993

[54] MAGNETORESISTIVE HEAD AND HEAD SETTING METHOD

[75] Inventors: Greg S. Mowry, Burnsville; Terry B. Mitchell, Bloomington, both of Minn.

[73] Assignee: Seagate Technology, Inc., Scotts Valley, Calif.

[*] Notice: The portion of the term of this patent subsequent to Apr. 23, 2010 has been disclaimed.

[21] Appl. No.: 388,690

[22] Filed: Aug. 2, 1989

[51] Int. Cl.⁵ .............................................. G11B 5/127
[52] U.S. Cl. ..................................................... 360/113
[58] Field of Search .......................................... 360/113

[56] References Cited

U.S. PATENT DOCUMENTS 4,103,315  7/1978  Hempstead .................... 360/113 X
4,803,580  2/1989  Mowry ............................... 360/113

Primary Examiner—A. J. Heinz
Attorney, Agent, or Firm—Kinney & Lange

[57] ABSTRACT

A method of establishing a single domain in a magnetoresistive sensor positioned in a gap between two shield layers of magnetic material. The method includes the steps of heating the magnetoresistive head above the Néel temperature of at least one of the shield layers of magnetic material. Applying an external magnetic field to the magnetoresistive sensor and the shield layers for establishing a single magnetic domain in the magnetoresistive sensor. Reducing the intensity of the external magnetic field for holding the magnetization of the magnetoresistive sensor during cooling. Cooling the magnetoresistive head.

3 Claims, 3 Drawing Sheets

MAGNETORESISTIVE HEAD AND HEAD SETTING METHOD

BACKGROUND OF THE INVENTION

1. Field of the Invention

The present invention relates to magnetoresistive write/sense heads for magnetic media data storage systems, and, more particularly, to a method of setting the magnetic domain structure of the magnetoresistive sensor of an MR write/sense head after completion of fabrication of the head and to a MR write/sense head to which the method may be applied.

2. Description of Prior Art

Magnetoresistive (MR) sensors are employed as sense or read transducers in the write/sense heads of some types of magnetic disk drives. The electrical resistance of an MR sensor changes depending upon the sensor's proximity to a magnetic field. Additionally, the electrical resistance of a sensor positioned in a magnetic field varies as a function of the strength of the field. An MR sensor positioned above a magnetic data storage disk can be used to sense the magnetic fields associated with localized magnetic domains impressed on the disk. Such local magnetic domains represent data which the sensor reads.

An MR sensor typically comprises a thin layer of ferromagnetic material exhibiting a magnetoresistive effect, such as a nickel/iron alloy. The ferromagnetic layer is deposited on an electrically insulating substrate. MR sensors work best where the active region of the sensor has no magnetic domain boundaries. In other words, the MR sensor should be of a single domain. The presence of domain boundaries in the sensor gives rise to Barkhausen noise, a phenomena caused by the irreversible motion of magnetic domains in the presence of an applied magnetic field. Barkhausen noise cannot occur if no domain boundaries exist.

A number of designs for single domain sensor have been proposed. Maintaining a sensor in a single domain state necessarily implies domain stability in the sensor. Magnetic stability is enhanced where the structural components of the MR head and the MR sensor promote that stability. Magnetic stability becomes a detriment however where the MR sensor is in other than a single domain magnetic state. Typically, a single domain MR sensor is established in its desired magnetization at the time it is deposited because the stabilizing structure of the MR head makes magnetic setting of the sensor after completion of the head difficult. Great care has been taken in the remaining fabrication steps of the head after establishing the single domain state in the sensor to avoid its loss and consequent locking of multidomain states in the sensor.

A double-gap magnetoresistive head such as that described in U.S. Pat. No. 4,803,580, assigned to the assignee of the present invention, has separate write and sense gaps defined by arranging linearly a top magnetic pole, a middle magnetic pole, and a trailing shield. The top pole, the middle pole and the trailing shield are all constructed from magnetic materials, the top and middle poles being ferromagnetic and the trailing shield being ferrimagnetic. The write gap is the gap between the top pole and the middle pole and the sense gap is the gap between the middle pole and the trailing shield. The magnetoresistive sensor is positioned in the sense gap between the middle pole and the trailing shield. The MR sensor design is of a type which can support a single domain state. The middle pole and the trailing shield operate as shields for the sensor in application, substantially blocking from the sensor magnetic fields other than a magnetic field generated by a local magnetic domain positioned directly under the sense gap. This shielding is generally quite effective against the field strengths encountered in disk drive operating environments.

Magnetic fields encountered by the magnetoresistive write/sense head during manufacture can, however, be much stronger than those encountered in disk drive operating environments. The manufacturing processes currently used to produce MR heads which meet the small physical size and tight tolerances demanded of the heads makes avoidance of these strong magnetic fields, typically exceeding 100 Oersteds, both difficult and expensive.

The slider on which an MR write/sense head is integrated has dimensions on the order of 1 to 3 millimeters. In a disk drive, the head is required to maintain a flying height above a rotating disk which is only a fraction of even these small dimensions. The surface of the head facing the disk is called the Air Bearing Surface ("ABS"). The ABS is an extremely flat and highly polished surface, manufactured to exacting tolerances. Accordingly, the manufacture of MR write/sense heads requires the use of precision processing machines. Such machinery exists, having been developed for use in the manufacture of inductive thin-film transducers, a device of having applications similar to those of MR write/sense heads. Manufacturing economics is one factor encouraging the use of the same equipment for both inductive thin-film heads and MR heads.

Devices built to meet exacting dimensional standards are typically built on milling and cutting machines using magnetic chucks. Mechanical chucks cannot be used, generally, because mechanical clamping tends to deform the part being worked upon. This makes it difficult to machine a surface which meets desired tolerances upon release of the stress imposed by the clamp. A machining environment also tends to be corrosive. If a mechanical chuck is used, its reference surfaces can be exposed to corrosive effects with resulting loss of accuracy. However, positioning a magnetoresistive head magnetically results in exposure of the MR sensor to magnetic fields which can disrupt its single domain condition.

SUMMARY OF THE PRESENT INVENTION

The present invention is directed to a method of setting the magnetic domain structure of a magnetoresistive sensor positioned in a gap between two shield layers of magnetic material. The MR sensor and the shield layers are typically parts of an otherwise fully fabricated MR write/sense head. Such an MR head can include layers of polyimide or other organic polymer insulation, antiferromagnetic exchange-bias material exchange coupled to the MR sensor, electrical contacts and the like. At least one of the shield layers is preferably made of a ferrimagnetic material having a Néel temperature below the melting point of the organic insulating layers of the head.

The method includes the step of heating the magnetoresistive head above the Néel temperature of at least one of the shield layers of magnetic material. Where the MR sensor is exchange coupled to antiferromagnetic material, it is also necessary to raise the temperature above the Néel temperature of the antiferromagnetic material. Preferably, the Néel temperature is higher for the antiferromagnetic material than for the ferrimagnetic material of the shield layer. After the temperature of the body of the head has been raised above the appropriate temperature, i.e. the higher of the Néel temperatures for the shield layer and the exchange bias material, if present, an external magnetic field is applied to the magnetoresistive sensor and the shield layers to set the magnetization of the magnetoresistive sensor. Thereafter, the intensity of the external magnetic field is reduced to a level sufficient to hold the magnetization of the magnetoresistive sensor during cooling. The magnetoresistive head is then cooled.

Employment of the method is made possible by the MR head having at least one layer, preferably the trailing shield layer, made of a magnetic material having a Néel temperature below the melting point of the polyimide layers of the MR head. In the present invention, the MR write/sense head has a ferrimagnetic trailing shield, typically a nickel-zinc ferrite layer.

DETAILED DESCRIPTION OF THE PREFERRED EMBODIMENT

Figure 1:
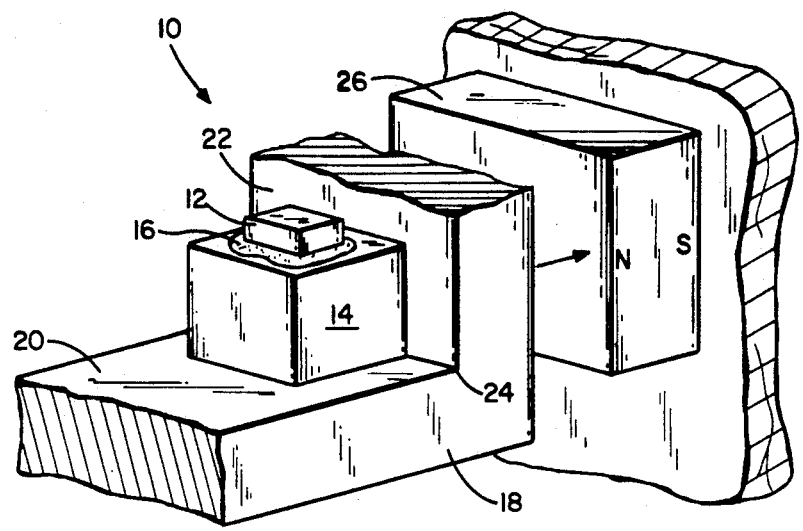
FIG. 1 is a cross sectional schematic view of a magnetic chuck.

FIG. 1 illustrates the machining environment to which magnetoresistive write/sense heads are subjected after fabrication. A workpiece 12 is positioned in a magnetic chuck assembly 10 for a step such as grinding. Workpiece 12 is temporarily affixed to a cubic mounting tool 14 by an epoxy resin layer 16. Cubic mounting tool 14 is made of a magnetic material such as high grade tool steel. Mounting tool 14 rests on support 18, which includes two flat positioning surfaces 20 and 22 which meet at a right angle 24. Magnet 26 is positionable adjacent support 18 to attract mounting tool 14 squarely into the right angle 24 formed by the support surfaces. Highly accurate placement of tool 14 is achieved for carrying out of the desired fabrication step of workpiece 12. However, workpiece 12 is exposed to strong magnetic fields. Where workpiece 12 is an MR head there is a strong potential for disruption of the domain structure of an MR sensor in the MR head.

Figure 2:
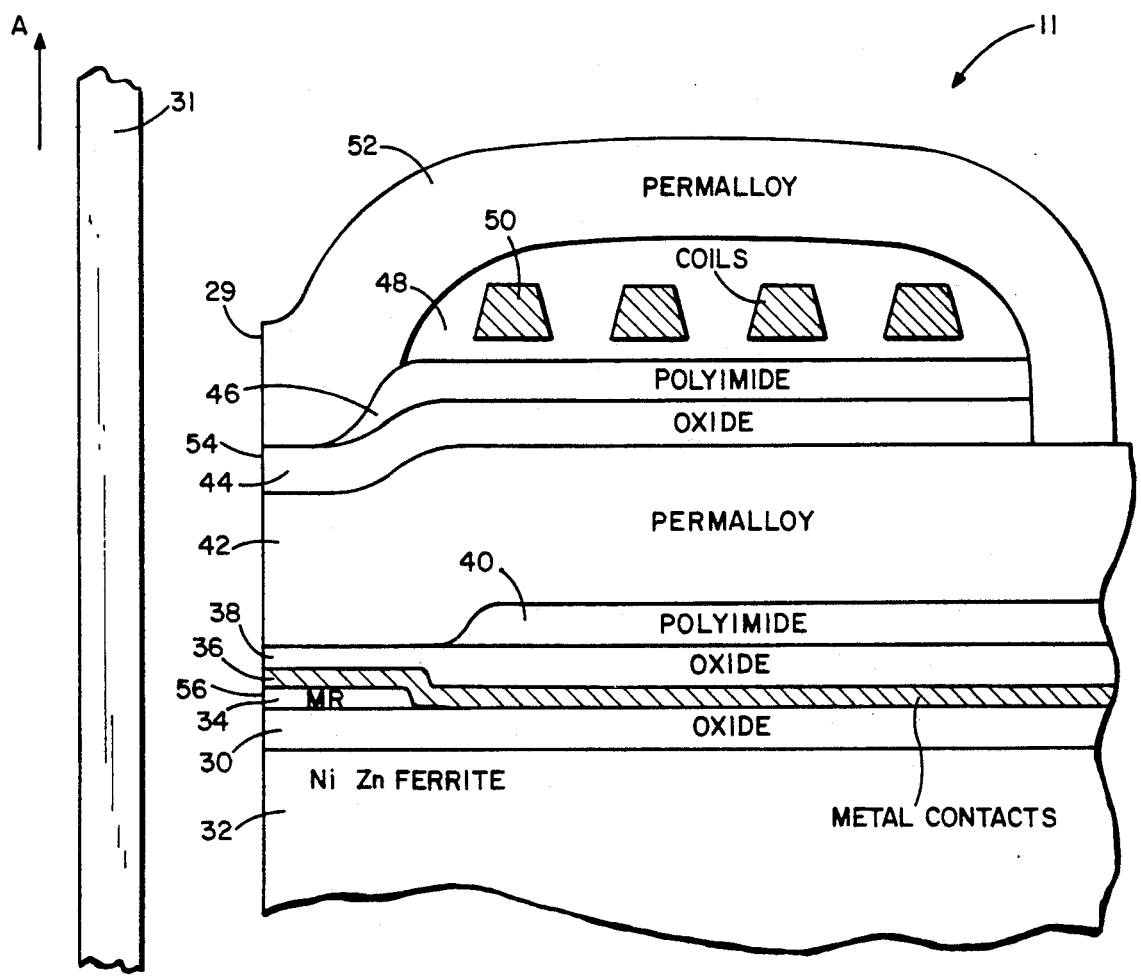
FIG. 2 is a cross sectional view of a double-gap MR head illustrating orientation of the head with respect to a magnetic media disk.

FIG. 2 illustrates an exemplary double-gap MR head 11 in a disk drive environment. MR head 11 has an air bearing surface 29 ("ABS") which meets exacting tolerances for flatness and degree of polish, and which is machined with MR head 11 held in a magnetic chuck. ABS 29 is formed by lapping magnetic head 11 in a process like that described with reference to FIG. 1. ABS 29 faces a magnetic media data storage disk 31 having a direction of travel relative to MR head 11 indicated by arrow "A". The spacing between ABS 29 and disk 31 is preferably minimized while avoiding contact between head 11 and the disk. A write gap 54 is defined on ABS 29 by oxide layer 44 between the terminating ends of top magnetic pole 52 and middle magnetic pole 42. A sense gap 56 is defined on ABS 29 by oxide layers 38 and 30, and MR sensor layer 34 between the terminating ends of middle magnetic pole 42 and ferrite substrate 32.

MR head 11 is formed on nickel-zinc ferrite substrate 32. Ferrite substrate 32 is a nickel-zinc ferrite in the preferred embodiment, although other ferrites can be used, for example, manganese-zinc ferrite. Nickel zinc ferrite is a ferrimagnetic material having a Néel temperature of about 400 K. A layer of oxide 30, preferably aluminum oxide, is deposited on substrate 32. Magnetoresistive sensor layer 34 is positioned on top of a portion of oxide layer 32 and extends to the bearing surface 25. Antiferromagnetic material (see FIG. 3) may be positioned on MR sensor layer 34 for exchange biasing the sensor in a known manner. Metal contacts 36 (one being shown in the view of FIG. 2) are positioned in contact with magnetoresistive sensor layer 34. An oxide layer 38 overlays magnetoresistive sensor layer 34 and metal contacts 36. A polyimide layer 40 overlays a portion of oxide layer 38 away from air bearing surface 29.

A middle magnetic pole 42, preferably a ferromagnetic material, overlays polyimide layer 40 and oxide layer 38. A write gap oxide layer 44, and polyimide layers 46 and 48 space middle magnetic pole 42 from top magnetic pole 52. Top pole 52 is also a ferromagnetic alloy, typically but not exclusively permalloy. Electrically conductive coil 50 is provided for generating magnetic fields across write gap 54 and is positioned in polyimide layer 48. Middle magnetic pole 42 and substrate 32 provide first and second layered shields for MR sensor layer 34.

Figure 3:
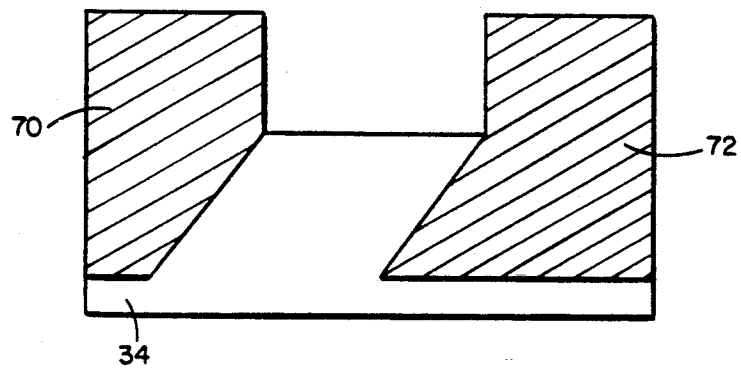
FIG. 3 is an elevation of a magnetoresistive sensor layer with overlying layers of exchange-bias material at the ends.

FIG. 3 illustrates the locations of deposits 70 and 72 of antiferromagnetic material over opposite ends of an elongated stripe of magnetoresistive material 34. The antiferromagnetic material is exchange coupled to the magnetoresistive material and is used for locking the magnetization of the magnetoresistive material.

Figure 4A:
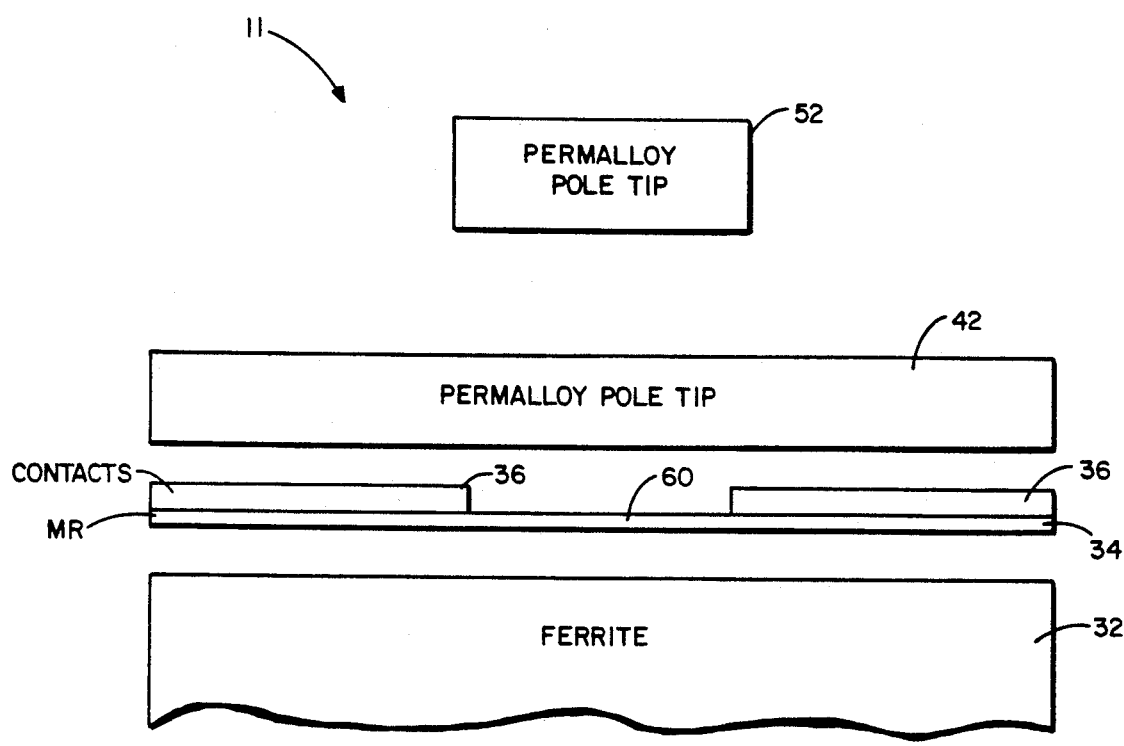
FIG. 4a is an end view of the magnetically significant elements of a double-gap MR head.

FIG. 4a illustrates in end view the magnetically significant components of MR head 11 as they appear looking toward the air bearing surface. Spacing and insulating layers are omitted for clarity. Ferrite substrate 32 and middle magnetic pole 42 are spaced providing a shielded gap in which an magnetoresistive sensor 60 is disposed. MR sensor 60 comprises that portion of magnetoresistive layer 34 between contacts 36, defined now as the width of sensor 60. Top magnetic pole 52 is depicted as being of substantially less width and about the same thickness as middle magnetic pole 42. This arrangement protects MR sensor 60 from interference from magnetic fields generated across the write gap between top pole 52 and middle pole 42.

Figure 4B:
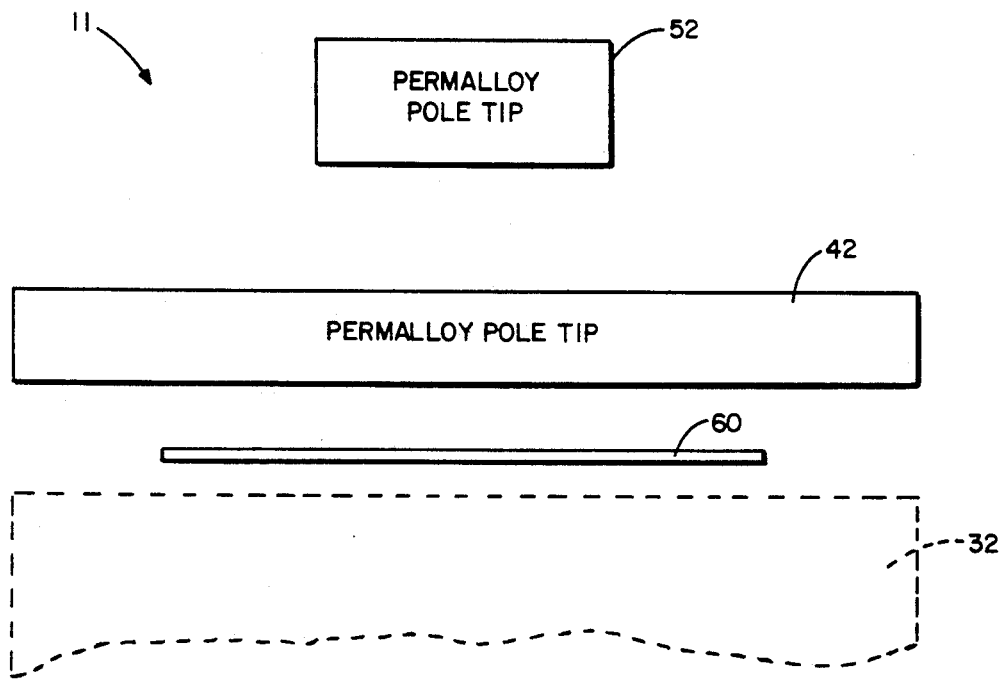
FIG. 4b is an end view of the magnetically significant portions of the double-gap MR head upon heating of the head.

The present process permits exchange stabilized MR structures to be magnetically set after all physical processing of the MR head is complete. FIG. 4b illustrates the magnetic components of MR head 11 after heating the head to a temperature above the Néel temperature of nickel zinc ferrite substrate 32, and the Néel temperature of the antiferromagnetic material if any, but remaining well below the Curie temperatures of top and middle pole layers 42 and 52. The Néel temperature of nickel zinc ferrite substrate 32 is about 120° to 130° Celsius or 400 K. The Néel temperature of a typical iron-manganese antiferromagnetic alloy is about 410 K. Raising MR head 11 temperature to just above these temperatures does not effect the integrity of the several polyimide spacing layers. Above their respective Néel temperatures, substrate 32 and any antiferromagnetic layers 70 and 72 become paramagnetic and no longer shield MR sensor 60.

MR sensor 60 can be exposed, after heating as described above, to an external magnetic field which consistently orders the internal magnetic domain structure of the sensor 60 into a single domain. Thus all domain boundaries in MR sensor 60 are cleared out of the sensor 60 and the remaining single domain is oriented in the direction of the applied field. A magnetic field of 300 to 500 Oersteds is used to set the MR sensor to a single domain. Thereafter, the applied magnetic field is reduced to 5 to 10 Oersteds for the purpose of holding the magnetization of MR sensor 60 in the proper direction during cooling. The head is then cooled below the Néel temperature for substrate 32 and the magnetic field is reduced to zero.

MR sensor 60 is preferably not as wide as middle pole 42. This prevents destabilization of MR sensor 60 by demagnetizing fields generated by middle pole 42 upon exposure to the high intensity magnetic field of the process. Experiment has shown that the method of the present invention works best if the width of MR sensor 60 is no greater than the width of middle magnetic pole 42 less ten times the thickness of the middle magnetic pole. Those skilled in the art will realize that although the MR sensor 60 is described as shielded herein, such shielding is not always effective against magnetic field strengths on the order of several hundred Oersteds.

Figure 5:
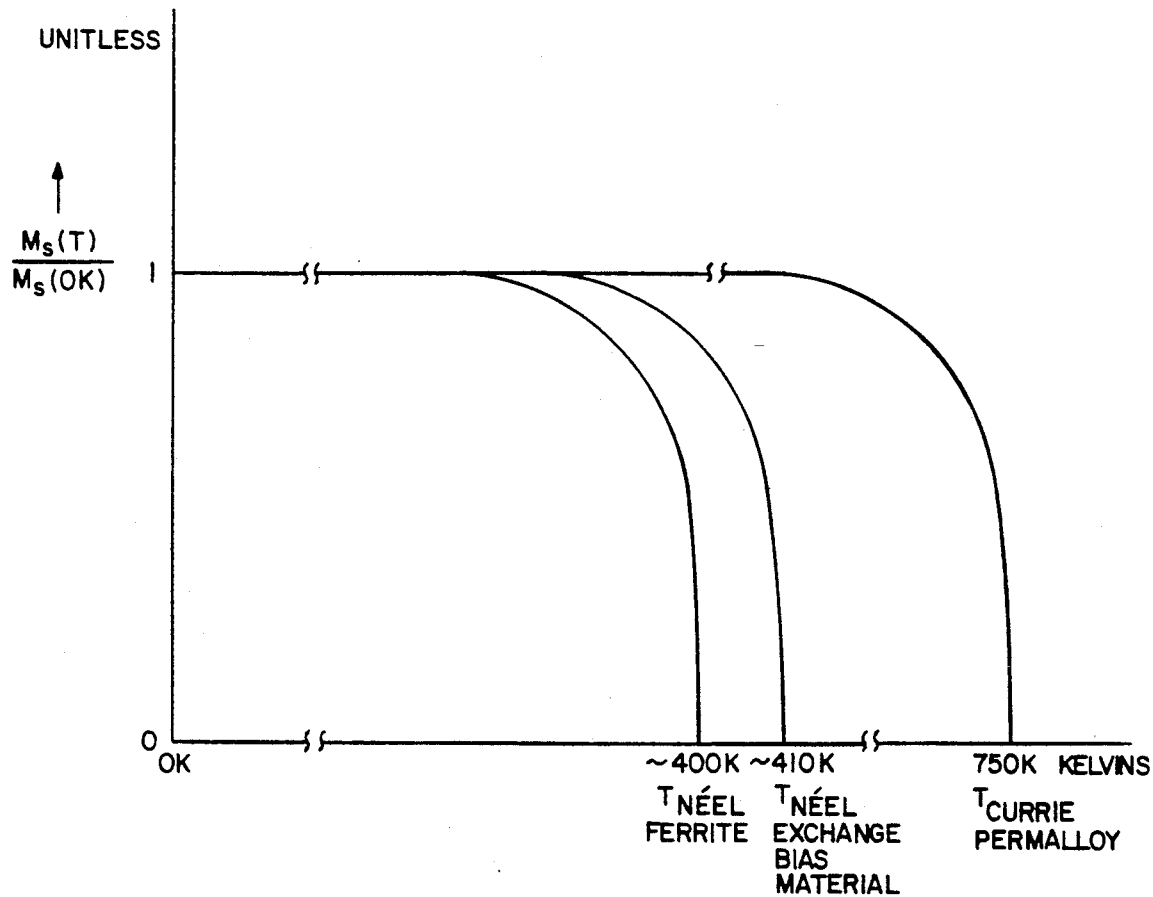
FIG. 5 is a graph of the relative saturation magnetization of the magnetic materials of the MR head as a function of absolute temperature.

FIG. 5 illustrates changes in the relative saturation magnetization of the magnetic materials of MR head 11 as a function of temperature in Kelvins. A "0" saturation magnetization indicates a temperature where the materials become paramagnetic. A "1" saturation magnetization is the saturation magnetization at 0 K. A typical permalloy alloy used in MR sensors becomes paramagnetic at its Curie temperature of 750 K. The exchange bias effect of Fe Mn antiferromagnetic material disappears above the Néel temperature of 410 K. The nickel-zinc ferrite used for one of the shield layers has a Néel temperature of 400 K. Thus the antiferromagnetic material exhibits a higher Néel temperature than the ferrite substrate. During cooling of the head from a temperature exceeding 410 K, the MR sensor remains unshielded and bathed in a controlled magnetic field until the exchange bias effect reasserts itself. The presence of the exchange bias effect helps stabilize the MR sensor element when control over the magnetic fields around the MR sensor is lost through the ferrite shield again becoming magnetic.

Although the present invention has been described with reference to preferred embodiments, workers skilled in the art will recognize that changes may be made in form and detail without departing from the spirit and scope of the invention.

What is claimed is:

1. A method of setting the magnetic domain structure of a magnetoresistive sensor positioned in a substantially completely fabricated magnetoresistive write/-sense head, the magnetoresistive had including, a magnetic substrate, a ferromagnetic middle pole positioned to define a gap between itself and the magnetic substrate, an insulating material partially filling the gap and the magnetoresistive sensor, the magnetoresistive sensor being disposed in the gap spaced from both poles, the method comprising:

constructing the magnetic substrate from a ferrite material having a Néel temperature below the melting point of the insulating material; heating the substantially completely fabricated magnetoresistive head above the Néel temperature of the ferrite forming the magnetic substrate, but below both the melting point of the insulating material and the Curie temperature of the ferromagnetic middle pole;

applying an external magnetic field to the magnetoresistive head to substantially eliminate domain boundaries from the magnetoresistive sensor;

reducing the intensity of the external magnetic field to hold the magnetization of the magnetoresistive sensor during cooling; and cooling the magnetoresistive head to a temperature below the Néel temperature of the ferrite forming the magnetic substrate.

2. The method set forth in claim 1, wherein the magnetoresistive head further includes antiferromagnetic material exchange coupled with the magnetoresistive sensor, the method comprising further:

selecting the antiferromagnetic material exchange coupled with the magnetoresistive sensor to have a Néel temperature slightly higher than that for the ferrite material of the magnetic substrate;

heating the magnetoresistive head above the Néel temperature of the antiferromagnetic material.

3. The method of claim 2 comprising further:

limiting the width of the magnetoresistive sensor to the width of the ferromagnetic middle pole less tens times the thickness of the ferromagnetic middle pole.

* * * * *